Figure 1:
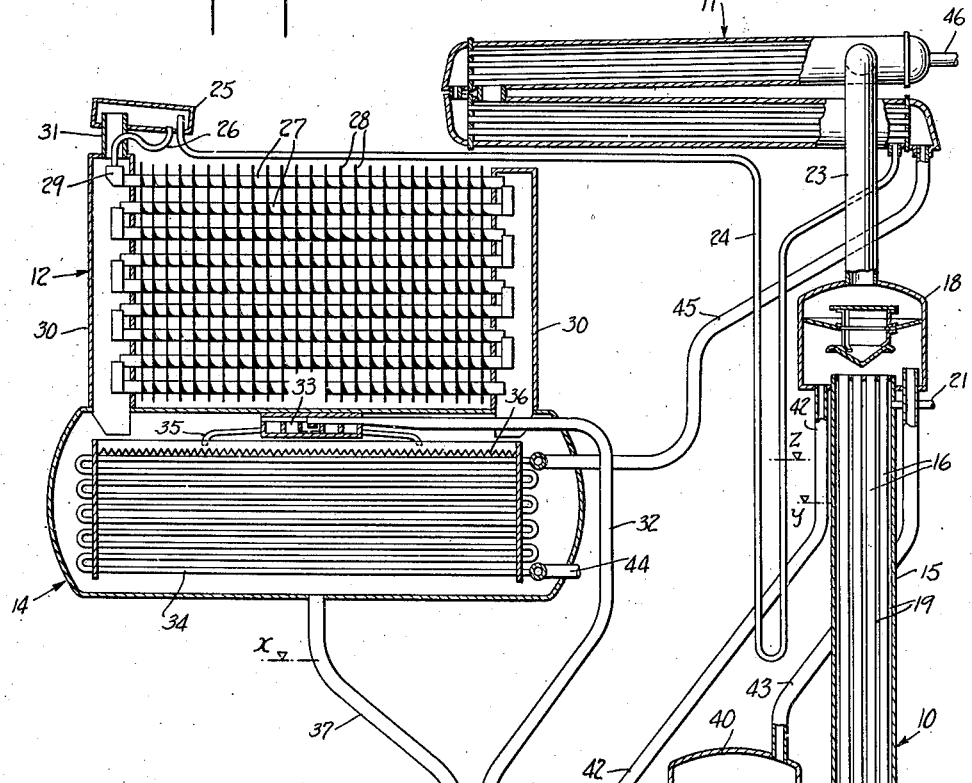

Jan. 29, 1946.   F. A. GROSSMAN   2,393,630
REFRIGERATION
Filed May 13, 1941

INVENTOR
Franklin A. Grossman
BY
ATTORNEY

Patented Jan. 29, 1946

2,393,630

UNITED STATES PATENT OFFICE 2,393,630

REFRIGERATION

Franklin A. Grossman, Evansville, Ind., assignor to Servel, Inc., New York, N. Y., a corporation of Delaware Application May 13, 1941, Serial No. 393,161

8 Claims. (Cl. 62—119)

My invention relates to refrigeration, and more particularly to refrigeration systems of the absorption type.

In refrigeration systems of this type absorption solution enriched in refrigerant flows from an absorber to a generator with refrigerant vapor being expelled out of solution in the generator by heating. The generator constitutes the heat receiving part of the refrigeration system and is also referred to as a vapor expeller. The expelled refrigerant is often utilized to raise or lift absorption liquid to a higher level by gas or vapor-lift action. A generator in which liquid is raised by vapor-lift action may include one or more heated riser tubes in which absorption liquid is carried up as an annulus with expelled refrigerant vapor in the center. The expelled refrigerant vapor, which is formed due to heating of the riser tubes, rises more rapidly than the absorption liquid with the liquid following along the inside walls of the tubes. In generators of the type just referred to objectionable noises are often produced due to collapse of vapor bubbles which is referred to as condensate knocking. The objectionable noises produced in the generator may also be due to superheating which tends to cause instantaneous and momentary lifting of relatively large quantities of liquid, whereby a liquid bumping noise is produced with resulting disturbance in the normal steady flow of absorption liquid.

It is an object of my invention to provide an improvement for eliminating objectionable noises produced in the generator resulting from condensate knocking and superheating. More particularly, it is an object of the invention to provide such a path of flow for absorption liquid in the riser tubes that improved heat transfer is effected from the tube walls to the liquid therein. I accomplish this by providing helical coil inserts in the lower ends of the riser tubes. The helical coil inserts impart a swirling motion to liquid flowing upward in the lower parts of the tubes, so that all of the liquid is effectively brought in contact with the heated tube walls. Further, the swirling motion imparted to the liquid causes the liquid to flow at an increased velocity with a resulting higher heat transfer coefficient. By snugly fitting the helical coil inserts within the riser tubes, conduction of heat to the coil wires from the heated walls provides additional heating surface contacted by the liquid.

Figure 2:
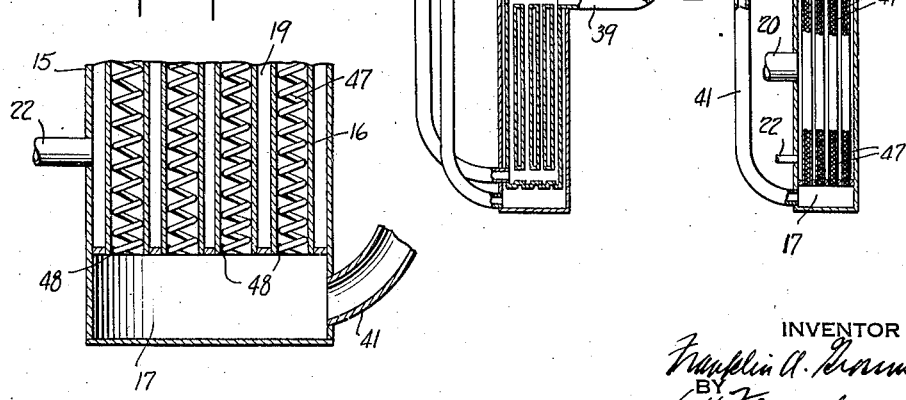

The invention, together with the above and other objects and advantages thereof, will be better understood from the following description taken in conjunction with the accompanying drawing forming a part of this specification, and of which:

Fig. 1 is a view more or less diagrammatically illustrating a refrigeration system embodying the invention; and Fig. 2 is an enlarged fragmentary view of the lower part of the generator shown in Fig. 1 to illustrate the invention more clearly.

Referring to Fig. 1, my invention is embodied in a two-pressure absorption refrigeration system like that described in application Serial No. 239,762 of A. R. Thomas and P. P. Anderson, Jr., filed November 10, 1938, now Patent No. 2,282,503 granted May 12, 1942. A system of this type operates at low pressures and includes a generator or vapor expeller 10, a condenser 11, an evaporator 12, and an absorber 14 which are interconnected in such a manner that the pressure differential in the system is maintained by liquid columns.

The disclosure in the aforementioned Thomas and Anderson application may be considered as being incorporated in this application, and, if desired, reference may be had thereto for a detailed description of the refrigeration system. In Fig. 1 the generator 10 includes an outer shell 15 within which are disposed a plurality of vertical riser tubes 16 having the lower ends thereof communicating with a space 17 and the upper ends thereof extending into and above the bottom of a vessel 18. The space 19 within shell 15 forms a steam chamber about the tubes 16 to which steam is supplied through a conduit 20. The space 19 provides for full length heating of tubes 16, a vent 21 being formed at the upper end of shell 15. A conduit 22 is connected to the lower part of shell 15 for draining condensate from space 19.

The system operates at a partial vacuum and contains a water solution of refrigerant in absorbent liquid, such as, for example, a water solution of about 40% lithium chloride by weight. With steam being supplied through conduit 20 to space 19 at atmospheric pressure, heat is applied to tubes 16 whereby water vapor is expelled from solution. The absorption liquid is raised by gas or vapor-lift action, the expelled water vapor forming a central core within an annulus of the liquid at the inner wall surfaces of the tubes which is lifted by upwardly flowing vapor. In vapor lifts of this character the expelled water vapor rises more rapidly than the liquid, and the liquid follows the vapor along the inside walls of tubes 16.

The water vapor flows upwardly through the tubes or risers 16 into vessel 18 which serves as a vapor separator. Due to baffling in vessel 18, water vapor is separated from raised absorption solution and flows through conduit 23 into condenser 11. The condensate formed in condenser 11 flows through a U-tube 24 into a flash chamber 25 and from the latter through a conduit 26 into evaporator 12.

The evaporator 12 includes a plurality of horizontal banks of tubes 27 disposed one above the other and to which are secured heat transfer fins 28 to provide a relatively extensive heat transfer surface. The liquid flowing to evaporator 12 is divided in any suitable manner for flow through the uppermost banks of tubes 27. The dividing of liquid may be effected by providing a liquid distributing trough 29 into which the liquid flows through the conduit 26. The water passes through successively lower banks of tubes through suitable end connections which are open to permit escape of vapor from the tubes, and any excess liquid is discharged from the lowermost bank of tubes 27.

The water supplied to tubes 27 evaporates therein to produce a refrigerating or cooling effect with consequent absorption of heat from the surroundings, as from a stream of air flowing over the exterior surfaces of the tubes 27 and fins 28. The vapor formed in tubes 27 passes out into end headers 30 which are connected at their lower ends to absorber 14. The flash chamber 25 is provided to take care of any vapor flashing of liquid being fed to evaporator 12 through U-tube 24. The flashed vapor formed in the initial cooling of the liquid flowing to chamber 25 from condenser 11 passes through a conduit 31 into one of the headers 30 and mixes with vapor formed in the evaporator 12, so that disturbances in the evaporator due to vapor flashing are avoided.

In absorber 14 refrigerant vapor is absorbed into concentrated absorption liquid which enters through a conduit 32. The entering absorption liquid flows into a vessel 33 in which liquid is distributed laterally or cross-wise of a plurality of vertically disposed pipe banks 34 which are arranged along side of each other. The liquid flows from vessel 33 through conduits 35 into a plurality of liquid holders and distributors 36 which extend lengthwise of and above the uppermost horizontal branches of pipe banks 34. Absorption liquid is siphoned over the walls of the liquid holders 36 to effect complete wetting of the uppermost pipe sections. Liquid drips from each horizontal pipe section onto the next lower pipe section, whereby all of the pipe sections are wetted with a film of liquid.

The water vapor formed in evaporator 12 passes through the headers 30 into the absorber 14 where it is absorbed by the absorption liquid, and, due to such absorption of water vapor, the absorption liquid is diluted. The diluted absorption liquid flows through a conduit 37, a first passage in liquid heat exchanger 38, conduit 39, vessel 40 and conduit 41 into the lower space 17 of generator 10. Water vapor is expelled out of solution in generator 10 by heating, and the solution is raised by gas or vapor-lift action in riser tubes 16, as explained above.

The absorption liquid in vessel 18 is concentrated since water vapor has been expelled therefrom in generator 10. This concentrated absorption liquid flows through a conduit 42, a second passage in liquid heat exchanger 38, and conduit 32 into the upper part of absorber 14. This circulation of absorption liquid results from the raising of liquid by vapor-lift action in vertical riser tubes 16, whereby the liquid can flow to absorber 14 and return from the latter to the generator 10 by force of gravity. The upper part of vessel 40 is connected by a conduit 43 to vessel 18, so that the pressure in vessel 40 is equalized with the pressure in the upper part of generator 10 and condenser 11.

The heat liberated with absorption of water vapor in absorber 14 is transferred to a cooling medium, such as water, for example, which flows upward through the vertically disposed pipe banks 34. The cooling medium enters the lower ends of the pipe banks 34 through a conduit 44 and leaves the upper ends of the pipe banks 34 through a conduit 45. The conduit 45 is connected to condenser 11 whereby the same cooling medium may be utilized to cool both condenser 11 and absorber 14, and from condenser 11 the cooling medium flows through a conduit 46 to waste.

The system operates at low pressures with the generator 10 and condenser 11 operating at one pressure and the evaporator 12 and absorber 14 operating at a lower pressure, the pressure differential therebetween being maintained by liquid columns. Thus, the liquid column formed in tube 24 maintains the pressure differential between condenser 11 and evaporator 12, the liquid column in conduit 37 maintains the pressure differential between the outlet of absorber 14 and generator 10, and the liquid column formed in conduit 32 and connected parts including conduit 42 maintains the pressure differential between the inlet of the absorber and the upper part of generator 10. In operation, the liquid columns may form in conduits 37, 42 and down-leg of tube 24 to the levels $x$, $y$ and $z$, for example. The conduits are of such size that restriction to gas flow is effected without appreciably restricting flow of liquid.

The liquid column formed in vessel 40 and conduit 41 provides the liquid reaction head for raising liquid in riser tubes 16 by vapor-lift action. The vessel 40 is of sufficient volume to hold the liquid differential in the system and is of such cross-sectional area that the liquid level therein does not appreciably vary, so that a substantially constant reaction head is provided for lifting liquid in generator 10.

In a generator like that described above, objectionable noises frequently are produced due to collapse of small vapor bubbles soon after they are formed. As the liquid rises in the lower parts of the tubes 16 the temperature of the liquid increases and, when the boiling temperature is reached, small vapor bubbles form in the regions which are in intimate contact with the tube walls. As the vapor bubbles increase in size and break away from the tube walls, the bubbles often suddenly collapse when passing into cooler regions of liquid rising in the center portions of the tubes. Stated another way, there is a radial temperature gradient in the rising body of liquid with the highest temperature at the tube walls and the lowest temperature in the center regions of the tubes. This is due to the more or less straight line motion of the liquid in the tubes 16. The parallel or stream line flow of the rising liquid in the tubes prevents heating of the core or center regions of the liquid except by conduction. Turbulence of liquid is effected, however, when vapor bubbles start to form. Nevertheless, when the liquid at the center regions is not at a sufficiently elevated temperature, the vapor bubbles collapse in such cooler regions to produce a clicking noise which is referred to as condensate knocking.

Superheating is another condition that often prevails in generators like the generator 10 described above. When the liquid in the lower parts of riser tubes 16 is heated above the boiling temperature and continues to remain in a liquid state, the continued application of heat eventually causes a relatively large volume of vapor to form practically instantaneously. With the sudden formation of a relatively large volume of vapor, an abnormally large amount of liquid is raised momentarily by gas or vapor-lift action with the result that the normal steady rate of flow of absorption liquid to absorber 14 is disturbed. This phenomenon is referred to as superheating and is due to lack of fluid in gas phase in the lower parts of riser tubes 16.

In accordance with my invention, in order to eliminate condensate knocking and superheating, I provide inserts at the lower ends of the riser tubes to cause the absorption liquid to flow in a more turbulent manner than heretofore. The insert preferably is of such form and shape that improved heating of liquid rising in tubes 16 is effected with the liquid flowing in a path which is sinuous or winding in character. In carrying out the invention I provide helical coil inserts 47 which extend within the lower parts of riser tubes 16. The inserts are secured in position in any suitable manner at the lower ends of the riser tubes, as by brazing or welding, for example, as indicated at 48.

The size of the wire, the diameter of the turns, and the pitch of the coils employed are dependent upon the size of the refrigeration system, and particularly the dimensions of the riser tubes. In a refrigeration system of about five tons ice melting capacity in which riser tubes approximately five feet long and one-half inch internal diameter are employed, I have found coils formed from $\frac{3}{32}$ inch wire with one-half inch pitch and from twelve to eighteen inches long quite satisfactory in operation. The turns of the helical coils are of such diameter that the coils fit snugly against and in good thermal contact with the inner wall surfaces of the tubes 16. It should be understood that the foregoing dimensions of the inserts are merely illustrative and that the length of the coil, the diameter of the turns, and size of the wire from which the coil is formed can always be properly proportioned with respect to the other parts of the refrigeration system to obtain the best rate of liquid lifting with substantial elimination of noise under all operating conditions.

When absorption liquid enters the lower ends of tubes 16, the inserts 47 impart a swirling motion to the liquid, the individual turns of the inserts tending to cause the liquid to take a path of flow which is more or less sinuous or winding. It is believed that the turbulence produced in the rising liquid at the region of the inserts 47, resulting from the swirling liquid motion, brings substantially all of the absorption liquid in contact with the tube walls which are heated by steam introduced into chamber 19, as explained above. Due to the swirling and turbulent movement of the liquid, the liquid acquires a higher velocity than heretofore with a consequent higher heat transfer coefficient. The snug pressure fit of the inserts 47 against the tube walls provides a good heat conductive path from the heated tube walls to the body of the wire forming the inserts, so that the inserts provide additional heat transfer surface with which absorption liquid can come in contact.

With the provision of additional heat transfer surface, imparting of turbulent movement to the rising liquid, and higher heat transfer coefficient, substantially uniform heating of liquid is effected. It is believed that with the improved heating of liquid in the manner described above, the vertical extent in the riser tubes in which boiling of liquid takes place is reduced, that is, the upper limit at which boiling occurs in the rising liquid columns is lowered. With such lowering of the boiling regions in the tubes 16 an advantage accrues in that the rate of liquid lifting is increased, thereby tending to offset the additional resistance to liquid movement occasioned by the presence of the inserts 47.

With uniform heating of liquid, objectionable superheating is substantially avoided and negligible under practically all operating conditions. The presence of entrained vapor in the rising liquid in practically all regions which are at boiling temperature prevents the liquid from being superheated to a higher temperature due to lack of fluid in gas phase. It is believed that the smaller vapor bubbles formed are trapped under the insert wires along their entire lengths. As the vapor bubbles increases in size and break away from the tube walls from regions beneath the insert wire, there is more or less continuous ebullition of vapor throughout the entire extent of the inserts 47. The smaller bubbles trapped under the insert coils or wires supply a continuous vapor phase along the tube wall, so that superheating is prevented.

With more or less continuous ebullition of vapor throughout the entire extent of the inserts, an even and steady flow of liquid in riser tube 16 takes place so that the generator 10 will operate at maximum capacity. When periodic flow of liquid in the riser tubes takes place, the upper portions of the tubes become dry part of the time and all of the tube surfaces are not effective to expel refrigerant from solution during the dry periods. Even when the helical coil inserts 47 are provided, it should be understood that the lifting of absorption solution in the generator is never absolutely steady, because of the rocking action of the liquid column in conduit 41 and vessel 40. However, liquid is lifted more or less continuously in riser tubes 16 with the steady boiling action resulting from the presence of the helical coil inserts 47.

While a single embodiment of the invention has been shown and described, it will be apparent that modifications and changes may be made without departing from the spirit and scope of the invention, as pointed out in the following claims.

What is claimed is:

1. In an absorption refrigeration apparatus operable below atmospheric pressure, a vertically extending vapor expeller comprising a riser tube, a connection for introducing absorption solution enriched in refrigerant into the lower end of said tube, a connection for withdrawing solution deprived of refrigerant from the upper end of said tube, and a helical coil insert snugly fitting against the inner surface of said tube and located only in the lower part thereof.

2. In an absorption refrigeration apparatus operable below atmospheric pressure and utilizing water as a refrigerant, a vertically extending vapor expeller comprising a riser tube, a connection for introducing absorption solution enriched in refrigerant into the lower end of said tube, a connection for withdrawing solution deprived of refrigerant from the upper end of said tube, and a helical coil insert snugly fitting against the inner surface of said tube and located only in the lower part thereof.

3. In an absorption refrigeration apparatus operable below atmospheric pressure and utilizing water as a refrigerant, a vertically extending vapor expeller comprising a riser tube, a connection for introducing absorption solution enriched in refrigerant into the lower end of said tube, means for heating the exterior of said tube at a constant temperature to vaporize water from the solution therein, a connection for withdrawing solution deprived of refrigerant from the upper end of said tube, and a helical coil insert snugly fitting against the inner surface of said tube and located only in the lower part thereof.

4. In a vacuum type water absorption refrigerating system utilizing a solid absorbent in water solution, a generating vessel in which the solution is boiled to cause vaporization of water, means for applying heat at a fixed temperature to said vessel, and structure within said vessel to provide projections into the solution in the vessel to promote boiling and reduce superheating and condensate knocking.

5. In an absorption refrigerating system of the vacuum type utilizing water as a refrigerant and a solid in solution as an absorbent, a generator comprising an upright tube, means for supplying absorption solution to the lower end of the tube to a level therein below the top of the tube, means for applying heat at a constant predetermined temperature around the exterior of the tube to cause boiling of the absorption solution in the tube, said tube being so constructed and arranged as to cause the absorption solution to be raised to the top of the tube by the vapor generated therein, and structure in the lower end of the tube providing projections adjacent the inner surface thereof and causing turbulence of the solution to promote boiling of the solution whereby to reduce condensate knocking and superheating of the absorption solution.

6. In an absorption refrigerating system of the type which operates in a partial vacuum and utilizes water as a refrigerant, a generator comprising an upright tube, means for supplying a solution of the water to the lower end of the tube to a level therein below the top of the tube, means for supplying steam at atmospheric pressure around the exterior of the tube to cause boiling of the solution at the reduced pressure in the tube to vaporize the water, said tube being so constructed and arranged as to cause the solution to be raised to the top of the tube by the vapor generated therein, and structure in the lower end of the tube providing projections adjacent the inner surface thereof and causing turbulence of the solution to promote boiling of the solution whereby to reduce condensate knocking and superheating of the solution.

7. In an absorption refrigerating system of the type which operates in a partial vacuum and utilizes water as a refrigerant, a generator comprising an upright tube, means for supplying absorption solution to the lower end of the tube to a level therein below the top of the tube, means for applying heat around the exterior of the tube at a temperature to cause boiling of the absorption solution in the tube, said tube being so constructed and arranged as to cause the absorption solution to be raised to the top of the tube by the vapor generated therein, and structure in the lower end of the tube providing projections adjacent the inner surface thereof and causing turbulence of the solution to promote boiling of the solution whereby to reduce condensate knocking and superheating of the absorption solution.

8. In a vacuum type water absorption refrigerating system utilizing a solid absorbent in water solution, a generating vessel in which the solution is boiled to cause vaporization of water, means for applying heat to a wall of said vessel, and structure in said vessel below the liquid level therein and cooperating with the heated wall to trap small vapor bubbles against the wall and retard their flow upwardly through the solution whereby to maintain an extended vapor phase on the heat transmitting wall to promote boiling and reduce superheating.

FRANKLIN A. GROSSMAN.